(12) United States Patent
Sato

(10) Patent No.: US 10,247,344 B2
(45) Date of Patent: Apr. 2, 2019

(54) FLUID PASSAGE STRUCTURE

(71) Applicant: SUGINO MACHINE LIMITED, Uozu-shi, Toyama (JP)

(72) Inventor: Sho Sato, Uozu (JP)

(73) Assignee: Sugino Machine Limited, Toyama (JP)

(*) Notice: Subject to any disclaimer, the term of this patent is extended or adjusted under 35 U.S.C. 154(b) by 684 days.

(21) Appl. No.: 14/847,193

(22) Filed: Sep. 8, 2015

(65) Prior Publication Data

US 2016/0069498 A1 Mar. 10, 2016

(30) Foreign Application Priority Data

Sep. 10, 2014 (JP) .................................. 2014-184032

(51) Int. Cl.
  *F16L 41/00* (2006.01)
  *F16L 41/02* (2006.01)

(52) U.S. Cl.
  CPC .................................. *F16L 41/021* (2013.01)

(58) Field of Classification Search
  CPC ......... F16L 41/021; F16L 41/03; F16L 41/04; F16L 41/14; F16L 41/12
  USPC ...................................................... 285/130.1
  See application file for complete search history.

(56) References Cited

U.S. PATENT DOCUMENTS

| | | | |
|---|---|---|---|
| 1,903,819 A * | 4/1933 | Kocher | F16L 41/03 248/65 |
| 3,739,804 A * | 6/1973 | Dubreuil | F16K 11/04 137/269 |
| 4,708,372 A | 11/1987 | Arima et al. | |
| 9,255,647 B2 * | 2/2016 | Matthews | F16K 27/00 |
| 2002/0100509 A1 * | 8/2002 | Schlesch | F16T 1/38 137/597 |

(Continued)

FOREIGN PATENT DOCUMENTS

| | | |
|---|---|---|
| FR | 2329925 A1 | 5/1977 |
| JP | H10-159676 | 6/1998 |

(Continued)

OTHER PUBLICATIONS

Office Action dated Oct. 10, 2017 issued in the corresponding Japanese Patent Application No. 2014-184032.

(Continued)

*Primary Examiner* — David Bochna
*Assistant Examiner* — James A Linford
(74) *Attorney, Agent, or Firm* — Carrier Blackman & Associates, P.C.; William D. Blackman; Joseph P. Carrier

(57) ABSTRACT

A fluid passage structure includes a first flow passage and a second flow passage crossing with each other via a crossing portion in a casing, the crossing portion including a pair of arc-shape recessed portions formed to be a pair of arc-shape lines arranged in line symmetrical positions with respect to an axis of the second flow passage in a view along an axis of the first flow passage, each arc-shape line being a part of a cross sectional contour of the first flow passage; and an inside projecting portion formed between the arc-shape recessed portions to project toward an inside of the first flow passage by connecting each end of the arc-shape lines, each end being closer to the axis of the second flow passage than the other end of a corresponding one of the arc-shape lines in the view along the axis of the first flow passage.

4 Claims, 9 Drawing Sheets

(56) References Cited

U.S. PATENT DOCUMENTS

2006/0038399 A1* 2/2006 Tremoulet, Jr. .......... B24C 9/00
                     285/124.5
2015/0028580 A1* 1/2015 Sato ..................... F16L 41/021
                     285/130.1

FOREIGN PATENT DOCUMENTS

| JP | 2004-162701 | 6/2004 |
| JP | 2008-510937 A | 4/2008 |
| WO | 2006/023708 A1 | 3/2006 |

OTHER PUBLICATIONS

Extended European Search Report dated Jan. 25, 2016 corresponding to European Patent Application No. 15184720.9.

* cited by examiner

FIG. 2
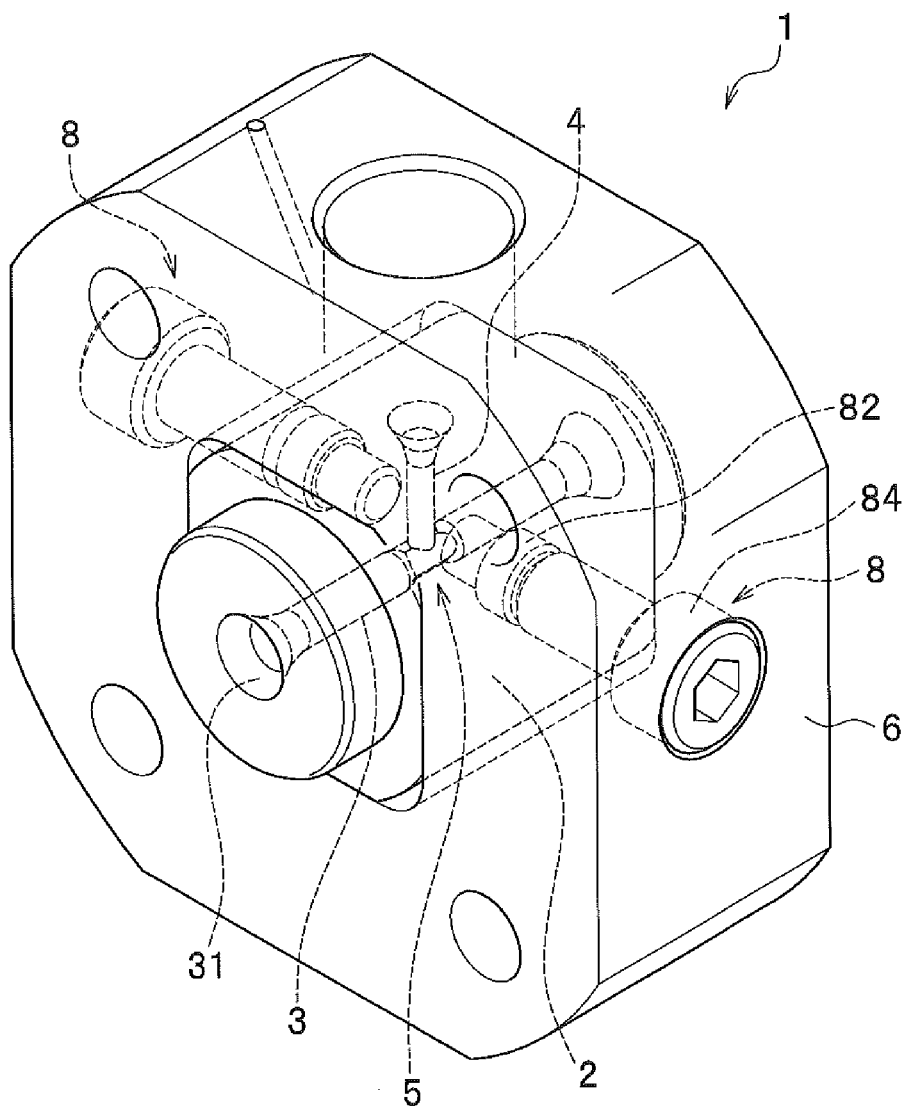
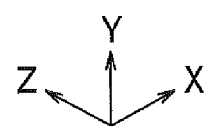

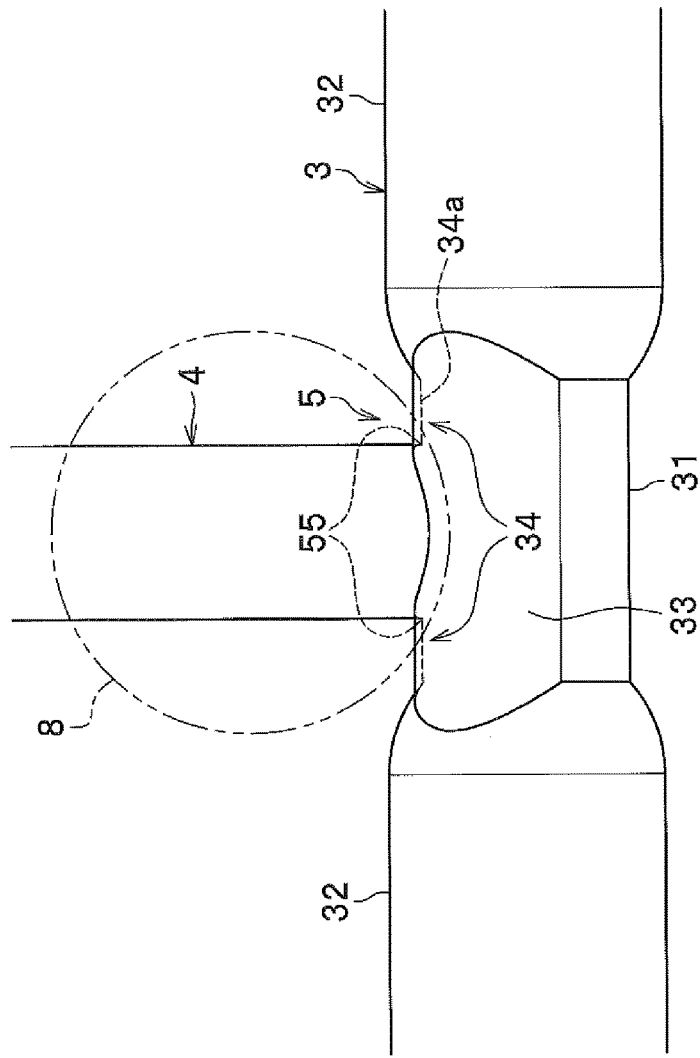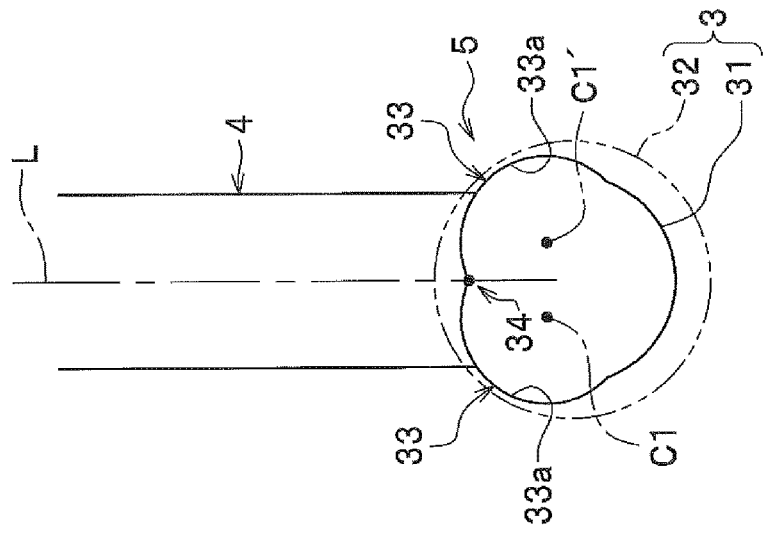

FLUID PASSAGE STRUCTURE

CROSS REFERENCE TO RELATED APPLICATION

This application claims the foreign priority benefit under Title 35, United States Code, 119 (a)-(d) of Japanese Patent Application No. 2014-184032, filed on Sep. 10, 2014 in the Japan Patent Office, the disclosure of which is herein incorporated by reference in its entirety.

BACKGROUND OF THE INVENTION

1. Technical Field

The present invention relates to a fluid passage structure, especially to a fluid passage structure having a crossing portion through which two flow passages cross with each other.

2. Description of Background Art

Conventionally, a high pressure joint like an L-shape joint, a T-shape joint, or a cruciform joint has a crossing portion through which two flow passages cross with each other. This joint is a joint through which a highly pressurized fluid supplied via a high pressure pump can be supplied to a prescribed portion after the flow of the highly pressurized fluid is bent, joined up, branched off or so on at the joint. The high pressure joint is widely used in a various jetting device for jetting a highly pressurized fluid or the like. Changing pressure (internal pressure) due to the highly pressurized fluid flowing in the flow passage repeatedly acts on the crossing portion of the high pressure joint. Consequently, it is known that a crack caused by the internal pressure affects seriously on the life of the joint (for example, refer to the patent literature 1).

In a high pressure joint described in the patent literature 1, compressive force is concentrated at positions directly over and directly under a crossing portion through which an X-axis flow passage and a Y-axis flow passage, which are formed on the same plane (X-Y plane) in the main body, cross with each other. Thereby, a Z-axis directional separating force (internal tensile stress) to act in the Z-axis direction orthogonal to the X-Y plane to force the main body to separate in the Z-axis direction is offset with the compressive force, so that a crack which may be caused in the X-Y plane is prevented.

Specifically, in the high pressure joint described in the patent literature 1, fixed compressive force is given to the crossing portion by fastening the main body via a first and a second compression members fastened with a fastening tool.

Patent literature 1: Japanese Unexamined Patent Publication (Translation of PCT Application) No. 2008-510937 (claims 1, 2, paragraphs 0018 to 0020)

BRIEF SUMMARY OF THE INVENTION

Firstly, as the high pressure joint described in the patent literature 1 is constituted to give the fixed compressive force to the crossing portion to offset the Z-axis directional stress, the Z-axis directional stress can be lowered. However, there has been a problem that fluctuation size (stress fluctuation amplitude) of load stress due to fluctuations of fluid pressure or flowing cannot be reduced. Furthermore, it can be assumed that the fluctuation size (stress fluctuation amplitude) of load stress due to fluctuations of fluid pressure or the like affects seriously on the life of a super high pressure joint like a joint through which a pressurized fluid having pressure equal to or more than 500 MPa flows by fatigue fracture or the like.

Secondly, as the high pressure joint described in the patent literature 1 is constituted to give the compressive force to the crossing portion by fastening with the fastening tool, the compressive force to be given has a limit. Therefore, it is assumed that the enough compressive force is hard to be given adequately to the super high pressure joint like a joint through which a pressurized fluid having pressure equal to or more than 500 MPa flows.

The present invention is created in view of such a background. It is an object of the present invention to provide a fluid passage structure to reduce an internal stress to be generated in a crossing portion, through which two flow passages cross with each other, to be able to improve the durability.

The first invention provides a fluid passage structure comprising:

a casing;

a first flow passage disposed in the casing;

a second flow passage disposed in the casing and crossing with the first flow passage; and a crossing portion through which the first flow passage and the second flow passage cross with each other, the crossing portion including;

a pair of arc-shape recessed portions which are formed to be a pair of arc-shape lines arranged in line symmetrical positions with respect to an axis of the second flow passage in a view along an axis of the first flow passage, each of the pair of arc-shape lines being a part of a cross sectional contour of the first flow passage; and an inside projecting portion which is formed between the pair of arc-shape recessed portions to project toward an inside of the first flow passage by connecting each end of the pair of arc-shape lines of the pair of arc-shape recessed portions, each end being closer to the axis of the second flow passage than the other end of a corresponding one of the pair of arc-shape lines in the view along the axis of the first flow passage.

In the present invention, the first flow passage of the crossing portion is provided with the pair of arc-shape recessed portions, each portion having an arc-shape line being a part of a cross sectional contour of the first flow passage, so pressure of the fluid (fluid pressure) flowing in the crossing portion acts on the pair of arc-shape recessed portions (arc-shape lines). Furthermore, the first flow passage of the crossing portion is provided with the inside projecting portion. The inside projecting portion is formed to project toward the inside of the first flow passage of the crossing portion. And the inside projecting portion is formed at a point or line segment of a crossing line where a peripheral wall surface of the first flow passage of the crossing portion crosses with a peripheral wall surface of the second flow passage. "Line symmetrical positions with respect to an axis of the second flow passage" in the present invention should not be interpreted strictly. That is, a position error at the same degree as a manufacturing error is allowed in the present invention.

Fluid pressure to act on the crossing portion acts uniformly on the peripheral wall surface of the first flow passage, that is, on the pair of arc-shape recessed portions and the inside projecting portion. The fluid pressure acting on the pair of arc-shape recessed portions adjacent to the inside projecting portion has a component in a direction (Z direction; Z-axis direction in DETAILED DESCRIPTION) orthogonal to the axis of the second flow passage and to the axis of the first flow passage, so the component in the Z direction of the fluid pressure gives compressive force (pressing force) to hold the inside projecting portion from both sides opposite to each other in the Z direction.

That is, because the crossing portion of the present invention is provided with the inside projecting portion, the compressive force (pressing force) in the Z direction is given to the point or the line segment of the crossing line and a portion around the point or the line segment, at which crossing line the peripheral wall surface of the first flow passage crosses with the peripheral wall surface of the second flow passage, by the pressure of the fluid flowing in the first flow passage.

The compressive force (pressing force) due to the fluid pressure to act on the arc-shape recessed portions adjacent to the inside projecting portion is not a fixed value like the compressive force (pressing force) due to the conventional compressive means, but changes in proportion to the fluid pressure in the crossing portion. Therefore, the higher the fluid pressure becomes, the larger the pressing force becomes. Consequently, stress fluctuation amplitude of the internal stress to be generated in the fluid passage structure by the fluid pressure to act on the crossing portion can be effectively restrained.

Thus, by the compressive force (pressing force) to act on the point or the line segment of the crossing line and the portion around the point or the line segment, at which crossing line the peripheral wall surface of the first flow passage crosses with the peripheral wall surface of the second flow passage, the present invention offsets an internal stress in the Z direction to force the casing to separate in the Z direction at the point or the line segment. Thereby, a crack to be caused in a plane (X-Y plane in DETAILED DESCRIPTION) including the axes of the first flow passage and the second flow passage is prevented from being caused and the durability can be improved.

Furthermore, the present invention can increase the compressive force (pressing force) to act on the point or the line segment of the crossing line and the portion around the point or the line segment, at which crossing line the peripheral wall surface of the first flow passage crosses with the peripheral wall surface of the second flow passage, according to the pressure of the pressurized fluid. So it is particularly preferable that the present invention is applied to a fluid passage structure having super high pressure like a structure in which a pressurized fluid having pressure equal to or more than 500 MPa flows.

The second invention is the fluid passage structure according to the first invention, wherein the pair of arc-shape lines cross at a point on a line parallel to the axis of the second flow passage in the view along the axis of the first flow passage so that the inside projecting portion is a ridge line along the axis of the first flow passage.

According to this constitution, the inside projecting portion is a ridge line along the axis of the first flow passage, so fluid pressure to act on the inside projecting portion is dispersed. Therefore, a component in the Z direction of the pressure (compressive force) can be effectively given to the arc-shape recessed portions adjacent to the inside projecting portion, so that a component of the pressure in a direction to force the first flow passage to expand can be reduced.

The third invention is the fluid passage structure according to the first invention or the second invention, wherein the first flow passage includes a crossing portion flow passage of the crossing portion and a connecting flow passage communicated with the crossing portion flow passage, a diameter of the connecting flow passage is larger than a diameter of the crossing portion flow passage, and the pair of arc-shape recessed portions are formed in the crossing portion flow passage.

According to this constitution, the arc-shape recessed portions are formed on the crossing portion flow passage the diameter of which is smaller than the diameter of the connecting flow passage, so that the arc-shape recessed portions can be easily formed in the crossing portion.

The fourth invention is the fluid passage structure according to any one of the first to third inventions, further comprising a pressing device to give pressing force to the casing while holding the casing from both sides opposite to each other in a direction orthogonal to the first flow passage and to the second flow passage, the pressing device being disposed at a position deviating along the axis of the second flow passage from the axis of the first flow passage in the crossing portion.

According to this constitution, the pressing device is disposed at a position deviating outside along the axis of the second flow passage from the axis of the first flow passage, so that compressive force can be properly given to a stress concentration zone. Thereby, the internal stress due to the fluid pressure to force the crossing portion to separate in the Z direction is properly offset. That is, a crack to be caused in the plane (X-Y plane in DETAILED DESCRIPTION) including the axes of the first flow passage and the second flow passage is effectively prevented from being caused and the durability can be further improved.

The internal stress to cause a crack to separate the crossing portion in the Z direction is generated in the crossing portion by the fluid pressure of the fluid flowing in the crossing portion. The amplitude of the internal stress has the local maximum value (stress concentration) at the point (edge portion) or the line segment of the crossing line where the peripheral wall surface of the first flow passage crosses with the peripheral wall surface of the second flow passage, and becomes gradually smaller as it goes away from the point or the line segment.

The present invention comprises the inside projecting portion having the pair of arc-shape recessed portions on both sides of the inside projecting portion, so that the fluid pressure acting on the pair of arc-shape recessed portions adjacent to the inside projecting portion gives the largest pressing force to the point or the line segment of the crossing line, at which crossing line the peripheral wall surface of the first flow passage crosses with the peripheral wall surface of the second flow passage. The inside projecting portion and the pair of arc-shape recessed portions adjacent to the inside projecting portion are formed so that the pressing force becomes smaller as it goes away from the point or the line segment.

Thereby, a position corresponding to the local maximum value of the internal stress can be moved to a position (position away from the point or the line segment) outside the first flow passage along the axis of the second flow passage from the point (edge portion) or the line segment of the crossing line where the peripheral wall surface of the first flow passage crosses with the peripheral wall surface of the second flow passage.

Thus, the position of the local maximum value (stress concentration) of the internal stress is moved to a position (position away from the point or the line segment) outside the first flow passage along the axis of the second flow passage, and this constitution comprises the pressing device to give compressive force to the position of the local maximum value (stress concentration) of the internal stress. Therefore, the internal stress due to the fluid pressure, which forces the crossing portion to separate in the Z direction, is properly offset and the durability can be further improved.

The fluid passage structure according to the present invention reduces the internal stress to be generated in the crossing portion through which the two flow passages cross with each other, so that a crack to be caused in the plane (X-Y plane in DETAILED DESCRIPTION) including the axes of the first flow passage and the second flow passage is effectively prevented from being caused and the durability can be improved. Furthermore, stress fluctuation amplitude of the internal stress to be generated in the fluid passage structure by the fluid pressure to act on the crossing portion can be effectively restrained. So the fluid passage structure according to the present invention can be preferably applied to a super highly pressurized fluid passage structure like a fluid passage structure through which a pressurized fluid having pressure equal to or more than, for example, 500 MPa flows.

BRIEF DESCRIPTION OF THE SEVERAL VIEWS OF THE DRAWINGS

FIG. 2 is a perspective view of the joint shown in FIGS. 1A and 1B showing the structure of the joint according to the embodiment of the present invention;

FIG. 4A is an enlarged front view viewed in the Z-axis direction showing the structure of the crossing portion and the peripheral portion thereof in the joint according to the embodiment of the present invention;

FIG. 4B is a side view for FIG. 4A viewed in the X-axis direction showing the structure of the crossing portion and the peripheral portion thereof in the joint according to the embodiment of the present invention;

DETAILED DESCRIPTION OF THE INVENTION

A T-shape high pressure joint 1 of a fluid passage structure according to an embodiment of the present invention will be explained in detail properly with reference to FIGS. 1 to 8.

Figure 1A:
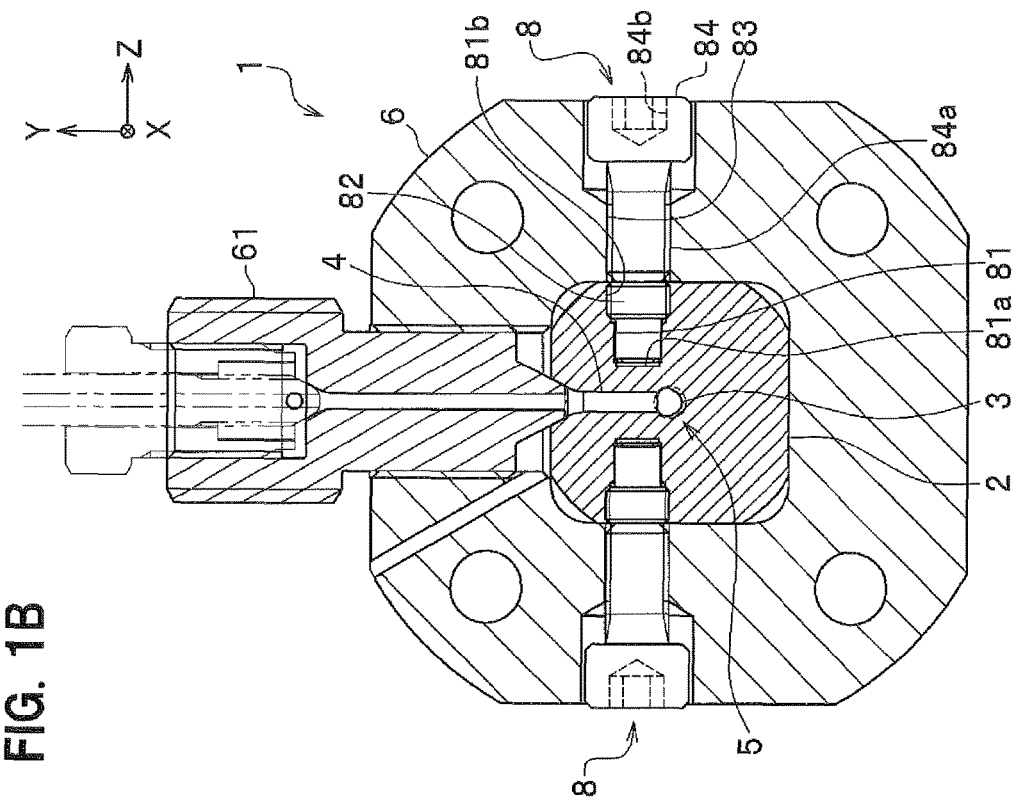
FIG. 1A is a sectional front view viewed in a Z-axis direction showing the structure of a joint according to an embodiment of the present invention.
Figure 1B:
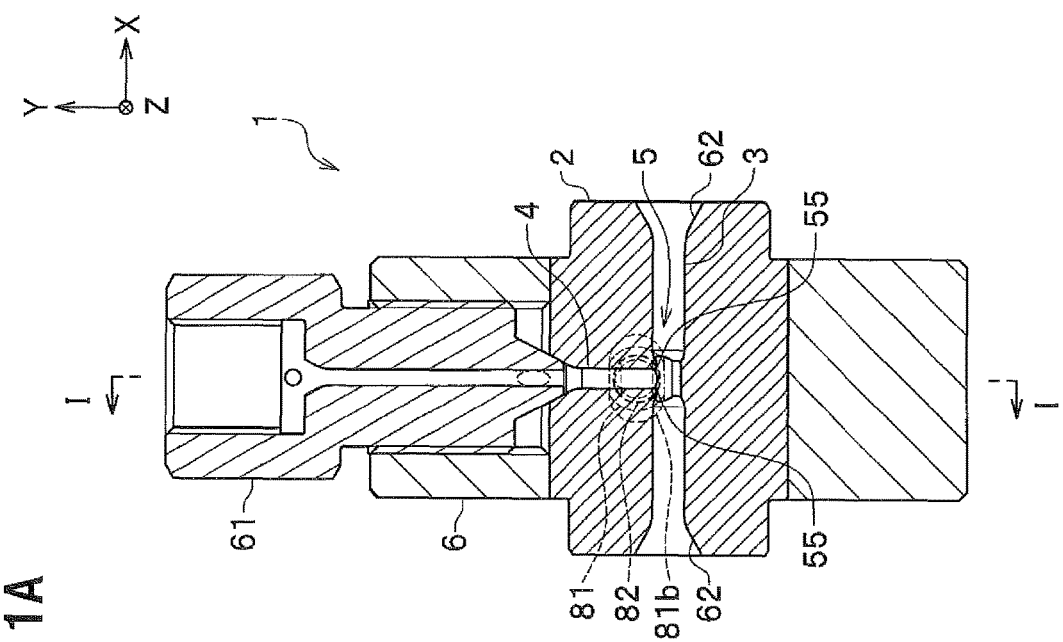
FIG. 1B is a sectional side view taken along a line I-I in FIG. 1A and viewed in a X-axis direction showing the structure of the joint according to the embodiment of the present invention.

As shown in FIGS. 1A and 1B, the high pressure joint 1 includes a first casing 2, a first flow passage 3, a second flow passage 4, a crossing portion 5, a second casing 6, and pressing devices 8. The first flow passage 3 and the second flow passage 4 are bored in the first casing 2. The first flow passage 3 and the second flow passage 4 crosses with each other through the crossing portion 5 in an X-Y plane. The second casing 6 is fitted on the first casing 2 to cover the first casing 2. The pressing devices 8 give compressive force to the first casing 2 from both sides in the Z-axis direction while positioning the crossing portion 5 between them.

In this specification, as shown in FIG. 2, a virtual plane on which axes of the first flow passage 3 and the second flow passage 4 are positioned is called the X-Y plane. A direction of the first flow passage 3 is set to be an X-axis direction, a direction of the second flow passage 4 is set to be a Y-axis direction, and a direction (direction orthogonal to the first flow passage and to the second flow passage) orthogonal to the X-Y plane is set to be a Z-axis direction. A plane including the Y-axis and the Z-axis is called a Y-Z plane, and a plane including the X-axis and the Z-axis is called an X-Z plane.

As shown in FIG. 1B, the first casing 2 has a shape like a rectangle bar member having a rectangle in a cross section thereof, and four arc portions are formed at the four corners of the first casing 2 in order to be easily inserted into the second casing 6. As shown in FIG. 1A, the first flow passage 3 and the second flow passage 4 are formed in the first casing 2 in the X-axis and Y-axis directions, respectively. Furthermore, the first flow passage 3 and the second flow passage 4 cross at right angles at the crossing portion 5. And the crossing portion 5 can make a highly pressurized fluid (not shown) flowing in the first flow passage 3 and (or) a highly pressurized fluid (not shown) flowing in the second flow passage 4 join or divide.

As shown in FIG. 1B, the second casing 6 is a plate-like member (refer to also FIG. 1A) having a through hole with a schematic rectangle contour in the central zone of the second casing 6, in which hole the first casing 2 is inserted. And the second casing 6 is provided with a connecting member 61 to connect a high pressure tube (not shown) for supplying the highly pressurized fluid to the second flow passage 4. The pressing devices 8 (refer to also FIG. 2) to give compressive force (pressing force) to the first casing 2 is disposed in the second casing 6.

Note that, in this embodiment, considering diversity for assembly or workability, the casing is composed of the separate first casing 2 and second casing 6. However, the present invention is not limited to this, the first casing 2 and the second casing 6 may be integrated.

As shown in FIG. 1A, the first flow passage 3 is a tubular flow passage formed along the X-axis direction on the X-Y plane in the first casing 2. Connecting portions 62, to which high pressure tubes (not shown) to flow the highly pressurized fluid therein are connected, are formed at the both end portions of the first flow passage 3.

Figure 3:
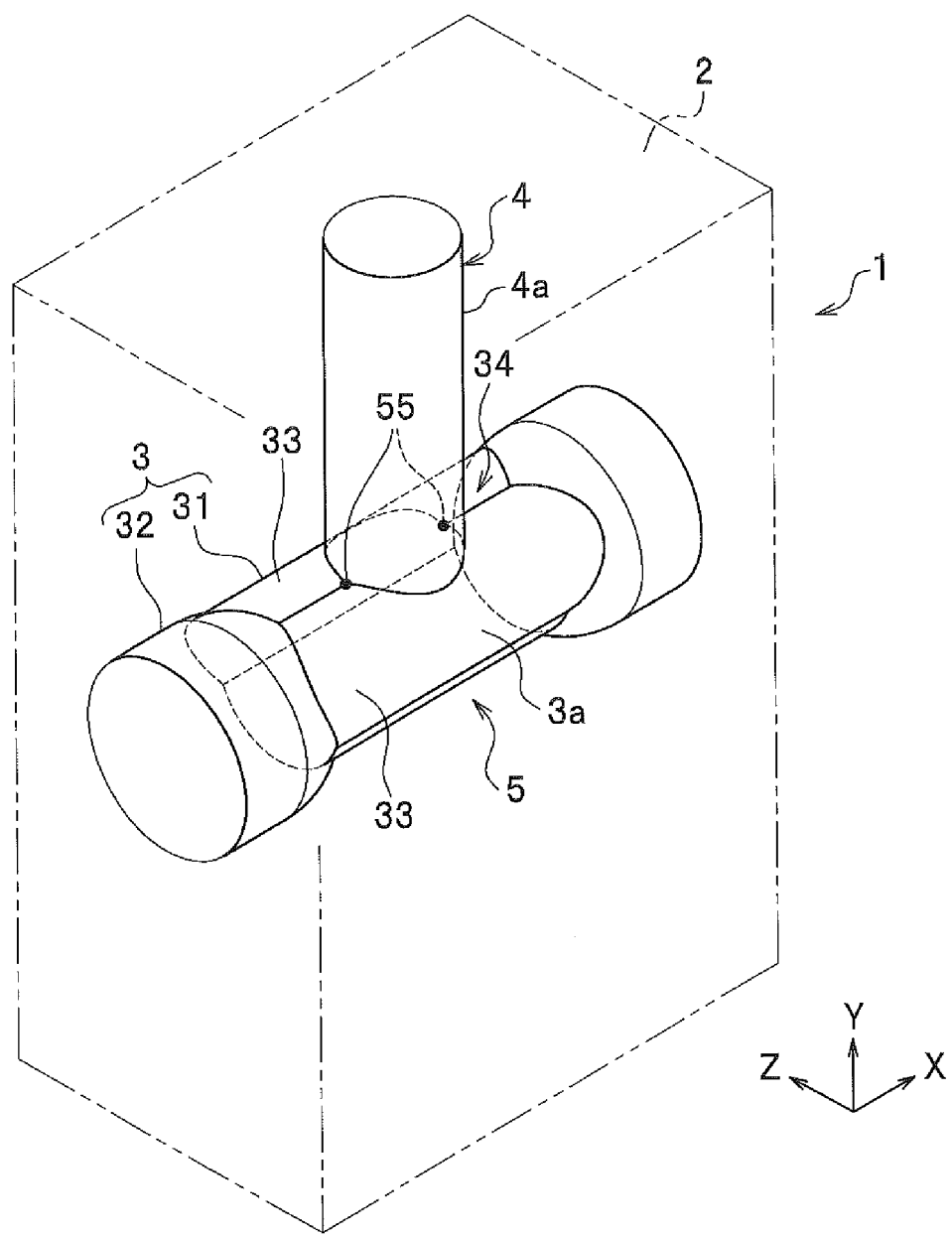
FIG. 3 is an enlarged perspective view schematically showing the structure of a crossing portion of the joint according to the embodiment of the present invention.

As shown in FIGS. 3 and 4A, the first flow passage 3 includes a crossing portion flow passage 31 of the crossing portion 5 and a connecting flow passage 32 connecting to the crossing portion flow passage 31. Furthermore, a pair of arc-shape recessed portions 33 and an inside projecting portion 34 between the pair of arc-shape recessed portions 33 are formed in the crossing portion flow passage 31.

The crossing portion flow passage 31 is a flow passage included in the crossing portion 5 which is connected to the second flow passage 4. This flow passage 31 is not limited to this embodiment and may be appropriately formed according to the specification and use of the high pressure joint 1 upon a length of the flow passage or relations to the passage diameter of the second flow passage 4.

As shown in FIG. 4A, considering the productivity of the pair of arc-shape recessed portions 33 and a reduction of the passage flow resistance, the connecting flow passage 32 has the passage diameter larger than that of the crossing portion flow passage 31.

As shown in FIG. 4B, the pair of arc-shape recessed portions 33 are formed in the crossing portion 5 of the first flow passage 3, and have a pair of arc-shape lines 33a in a view along the axis of the first flow passage 3. The pair of arc-shape lines 33a are arranged in line symmetrical positions with respect to the axis L of the second flow passage 4 in the view along the axis of the first flow passage 3. The pair of arc-shape lines 33a are parts of the cross sectional contour of the crossing portion flow passage 31 as shown in FIG. 4B. Namely, the pair of arc-shape recessed portions 33 are parts of the crossing portion flow passage 31. And as shown in FIG. 4B, each of the pair of arc-shape lines 33a has a center C1 or C1' thereof. The center C1 of the left side arc-shape line 33a is on the left side with respect to the axis L, and the center C1' of the right side arc-shape line 33a is on the right side with respect to the axis L in FIG. 4B. And in this embodiment, a diameter of each of the pair of arc-shape lines 33a is smaller than that of the crossing portion flow passage 31 not including the pair of arc-shape lines 33a.

According to this constitution, the passage diameter of the crossing portion flow passage 31 is smaller than that of the connecting flow passage 32, the diameter of each of the pair of arc-shape lines 33a is smaller than that of the crossing portion flow passage 31 not including the pair of arc-shape lines 33a, and the pair of arc-shape recessed portions 33 are formed in the crossing portion flow passage 31 but not formed in the connecting flow passage 32. Therefore, a reduction of the passage flow resistance can be performed, and a reduction of processing man-hours can be performed when the pair of arc-shape recessed portions 33 are formed in the crossing portion flow passage 31.

As to the inside projecting portion 34, in the view along the axis of the first flow passage 3, one arc-shape line 33a and the other arc-shape line 33a cross at one point on the axis L of the second flow passage 4. That is, the inside projecting portion 34 of this embodiment has a sharp ridge line 34a along the axis of the first flow passage 3. The inside projecting portion 34 (sharp ridge line 34a in this embodiment) has a position projected toward the inside of the first flow passage 3 as shown in FIGS. 4A and 4B. The inside projecting portion 34 (sharp ridge line 34a) belongs to the crossing portion flow passage 31.

The second flow passage 4 is a tubular flow passage lengthened in the Y-axis direction and formed in the first casing 2 as shown in FIG. 3. And the axis L of the second flow passage 4 is on the X-Y plane.

Note that, the first flow passage 3 and the second flow passage 4 can properly adopt various shapes according to the specification and use of the high pressure joint 1. In this embodiment, the diameter of the second flow passage 4 is set to be smaller than that of the crossing portion flow passage 31 of the first flow passage 3. But the both diameters are not limited to this, the both diameters may be the same, or the diameter of the second flow passage 4 may be larger than that of the crossing portion flow passage 31.

The crossing portion 5 is a portion at which the first flow passage 3 and the second flow passage 4 on the X-Y plane join or divide. Internal pressure in the crossing portion 5 changes because of the pressure fluctuations of the highly pressurized fluid supplied through the first flow passage 3 or the second flow passage 4, so that repeated stress (stress fluctuation amplitude) is loaded to the crossing portion 5. Therefore, the crossing portion 5 is exposed to severe conditions in use.

As to the crossing portion 5, two points on the X-Y plane of the crossing line where a peripheral wall surface 3a of the first flow passage 3 (crossing portion flow passage 31) crosses with a peripheral wall surface 4a of the second flow passage 4 are called crossing points 55 as shown in FIG. 3.

Specifically, the first flow passage 3 (crossing portion flow passage 31) lengthened in the X-axis direction and the second flow passage 4 lengthened in the Y-axis direction formed in the casing 2 join at the crossing portion 5 on the X-Y plane. The crossing points 55 of the crossing portion 5 are crossing points at which the peripheral wall surface 3a of the first flow passage 3 and the peripheral wall surface 4a of the second flow passage 4 cross with each other on the X-Y plane. That is, as shown in FIG. 4A, the crossing points 55 are crossing points at which the peripheral wall surface 3a of the first flow passage 3 and the peripheral wall surface 4a of the second flow passage 4 cross with each other in the view along the Z-axis direction.

As shown in FIG. 1B, the pressing devices 8 hold the first casing 2 from both sides in the Z-axis direction, that is, from two directions which are orthogonal to the first flow passage 3 and the second flow passage 4 and face mutually, to give compressive force (pressing force) to the crossing portion 5. Furthermore, the pressing devices 8 are arranged so as to give the pressing force at a position outside the first flow passage 3 (direction to go away from the crossing portion 5) along the axis L of the second flow passage 4 (in the view along the Z-axis direction). That is, the pressing devices 8 are arranged so as to give the pressing force at a position deviated from the axis of the first flow passage 3 upward in FIG. 4A along the axis L of the second flow passage 4.

Specifically, the pressing devices 8 do not press a position of the axis of the first flow passage 3, but press a position deviated outside (upward in FIG. 4A) from the crossing points 55.

Each of the pressing devices 8 includes a stepped bore 81 formed in the first casing 2, a pressing piece member 82 disposed in the stepped bore 81, a threaded hole 83 formed in the second casing 4 and coaxial with the stepped bore 81, and a screw 84 screwed into the threaded hole 83 to press the first casing 2 via the pressing piece member 82.

The pair of pressing devices 8 are disposed so as to face each other, so that the pressing devices 8 hold the first casing 2 from both sides in the Z-axis direction while positioning the crossing portion 5 between the pressing devices 8. Each of the pressing devices 8 is the same constitution. So the right side one of the pressing devices 8 in FIG. 1B will be explained, and a detailed explanation of the left side one will be omitted.

The stepped bore 81 is bored up to a position near the crossing portion 5 from the surface of the first casing 2 in the Z-axis direction, and has a plane bottom surface 81a and a stepped wide portion 81b. The pressing piece member 82 is positioned in the stepped bore 81 so that the front end of the pressing piece member 82 comes into contact with the plane bottom surface 81a. The screw 84 is screwed into the threaded hole 83 to come into contact with the head of the pressing piece member 82.

The screw 84 has a male thread portion 84a on the outer peripheral surface thereof to be screwed into the threaded hole 83, the front end thereof is formed to be a plane to come into contact with the pressing piece member 82, and furthermore, the screw 84 has a hexagon socket 84b for rotating the screw 84 at the rear end portion thereof.

According to this constitution, the pressing devices 8 can adjust the compressive force (pressing force) through the torque due to screwing the screw 84 into the threaded hole 83.

Operation and effect of the inside projecting portion 34 and the pair of arc-shape recessed portions 33 in the high pressure joint 1 according to the embodiment of the present invention constituted in such a way will be explained in detail mainly with reference to FIGS. 5A, 5B, 5C, 6 while comparing the embodiment with a comparative example (FIGS. 7A to 8C) having no inside projecting portion 34 and the pair of arc-shape recessed portions 33 for an example case of the pressure of 600 MPa.

Note that, in the high pressure joint 100 according to the comparative example (FIGS. 7A to 8C) having no inside projecting portion 34 and the pair of arc-shape recessed portions 33, a similar constitution corresponding to that in the high pressure joint 1 is designated by increasing (ten times or one hundred times) the number of digits of a reference numeral, and a detailed explanation of it will be omitted.

<Case Having No Inside Projecting Portion>

Figure 7C:
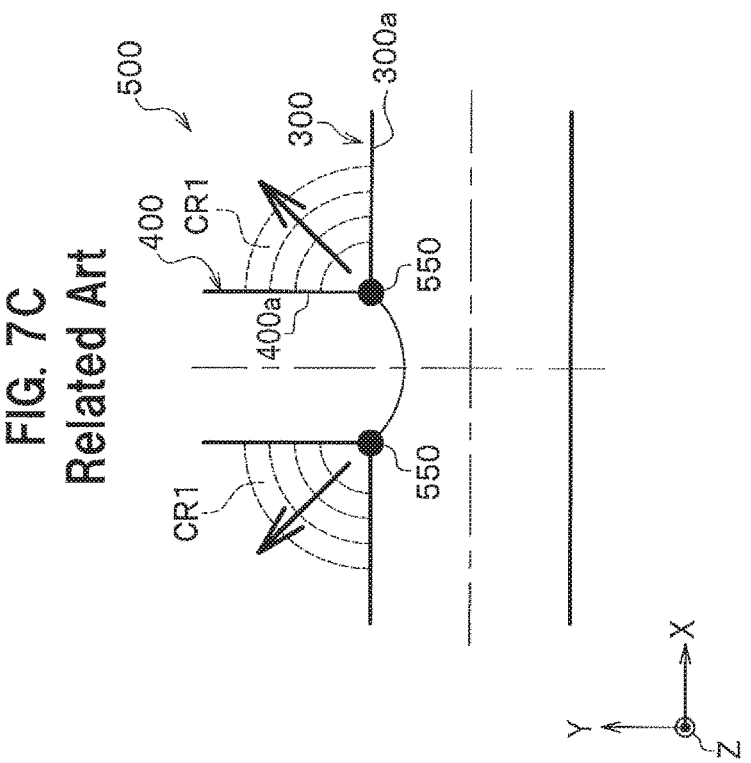
FIG. 7C is a schematic sectional view of the comparative example viewed in the Z-axis direction.
Figure 7A:
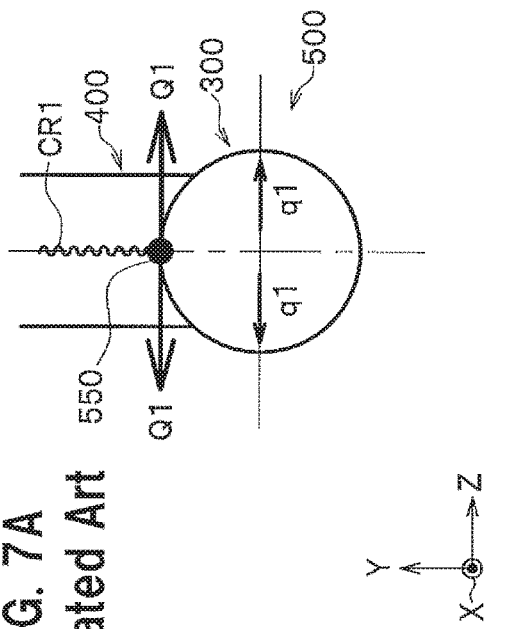
FIG. 7A is a schematic view viewed in the same direction as FIG. 5A showing a comparative example against the embodiment of the present invention.
Figure 7B:
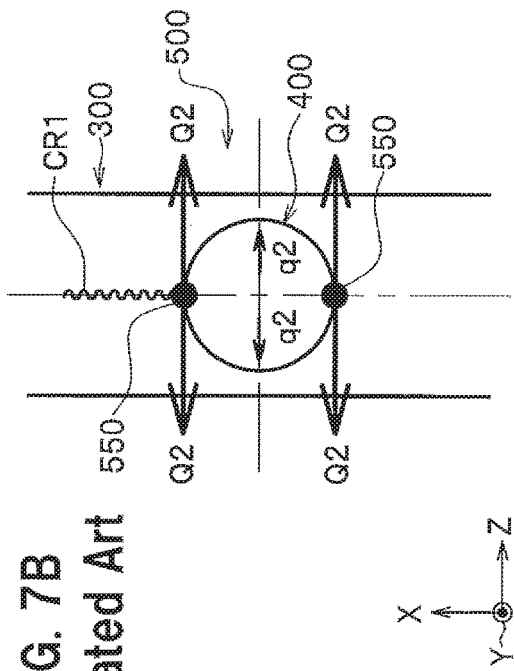
FIG. 7B is a schematic view of the comparative example viewed in the Y-axis direction.

In the high pressure joint 100 having no inside projecting portion 34 and the pair of arc-shape recessed portions 33, at crossing points 550 where a peripheral wall surface 300a of a first flow passage 300 and a peripheral wall surface 400a of a second flow passage 400 cross in viewing a crossing portion 500 in the Z-axis direction, as shown in FIG. 7A, internal stress Q1, which is generated by internal pressure q1 due to the pressurized fluid flowing in the first flow passage 300, acts in the Z-axis direction. Furthermore, as shown in FIG. 7B, internal stress Q2, which is generated by internal pressure q2 due to the pressurized fluid flowing in the second flow passage 400, also acts at the crossing points 550 in the Z-axis direction.

Thus stress concentration is caused at the crossing points 550 by the internal stresses Q1 and Q2, so that a crack CR1 is easily generated. If the crack CR1 is generated at the crossing points 550, the crack CR1 develops on the X-Y plane as shown in FIG. 7C.

Figure 8A:
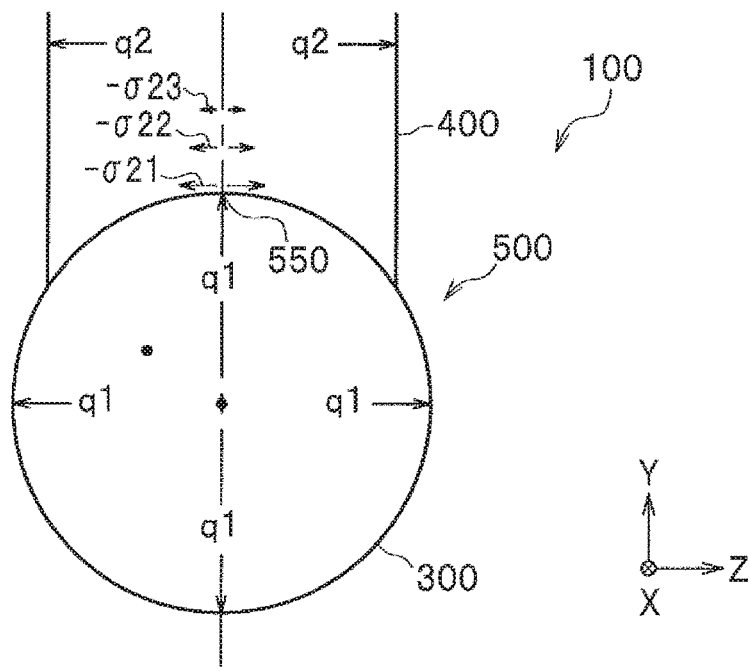
FIG. 8A is a view corresponding to FIG. 5A showing the comparative example.

The stress concentration caused at the crossing points 550 will be specifically explained with reference to FIGS. 8A, 8B, 8C. As shown in FIG. 8C, the maximum stress $\sigma 21$ (about 1600 MPa) is generated at the crossing points 550 (Y=0 mm). At a position 2 mm away in the Y-axis direction from the crossing points 550, a stress $\sigma 22$ (about 1000 MPa) is generated, and at a position 4 mm away in the Y-axis direction from the crossing points 550, a stress $\sigma 23$ (about 900 MPa) is generated. That is, internal stress $\sigma$ (tensile stress) in the Z-axis direction is the largest at the crossing points 550, and becomes smaller as it goes farther away in the Y-axis direction from the crossing points 550.

Figure 8B:
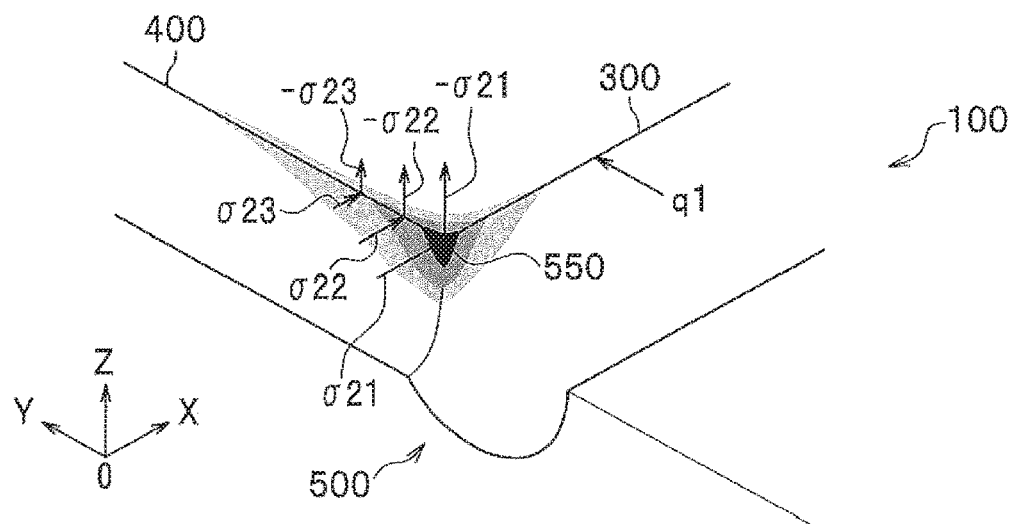
FIG. 8B is a view corresponding to FIG. 5B showing the comparative example.
Figure 8C:
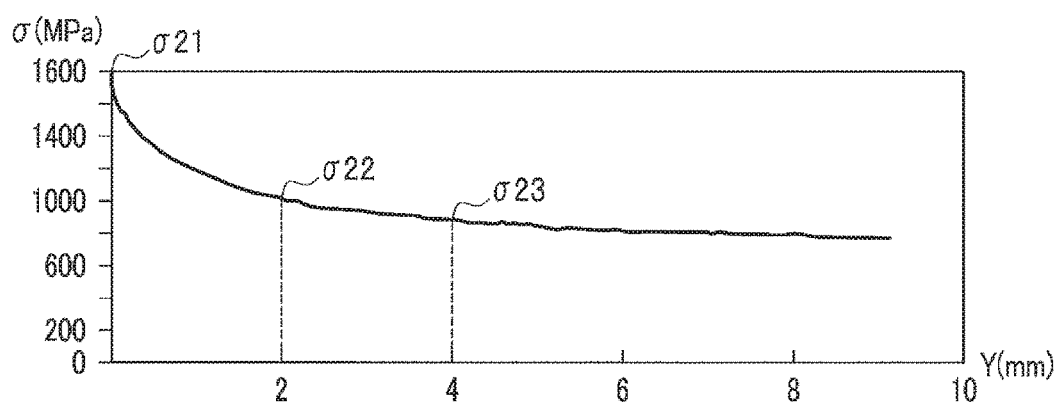
FIG. 8C is a view corresponding to FIG. 5C showing the comparative example.

As shown in FIG. 8B, the internal stresses $\sigma 21$, $\sigma 22$, $\sigma 23$ are internal stresses generated by the internal pressure q1 due to the pressurized fluid flowing in the first flow passage 300 and the internal pressure q2 due to the pressurized fluid flowing in the second flow passage 400, and tensile stresses.

For convenience of explanation, the explanation has been conceptually done by separating the internal stress Q1 which is generated by the internal pressure q1 due to the pressurized fluid flowing in the first flow passage 300 from the internal stress Q2 which is generated by the internal pressure q2 due to the pressurized fluid flowing in the second flow passage 400. The internal pressure q1 and the internal pressure q2 mutually affect each other at the crossing portion 500, the first flow passage 300, and the second flow passage 400. Therefore, status of the stress concentration at the second flow passage 400 and status of the stress concentration at the first flow passage 300 show a similar tendency.

<Case Having Inside Projecting Portion>

Figure 5A:
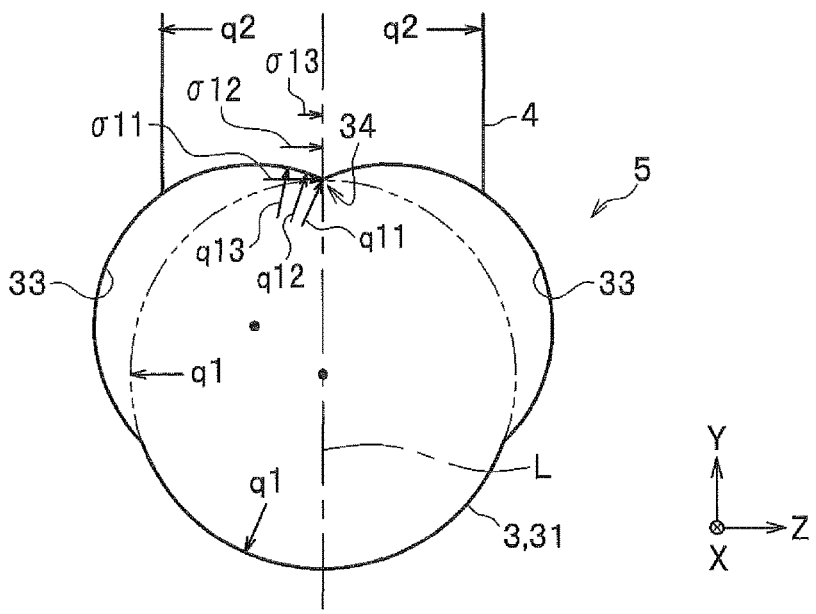
FIG. 5A is an enlarged view of the main part in FIG. 4B to explain an operation of the joint according to the embodiment of the present invention.

As shown in FIG. 5A, the high pressure joint 1 according to the embodiment of the invention has the inside projecting portion 34 and the pair of arc-shape recessed portions 33. Therefore, fluid pressures q11, q12, q13 (three pressures are shown representatively to easily compare with one another) act on the arc-shaped recessed portions 33 adjacent the inside projecting portion 34. The fluid pressures q11, q12, q13 include Z-axis directional component forces $\sigma 11$, $\sigma 12$, $\sigma 13$, respectively. The Z-axis directional component force ($\sigma 11$ among $\sigma 11$, $\sigma 12$, $\sigma 13$) is the largest at the inside projecting portion 34, and becomes smaller as it goes away from the inside projecting portion 34 ($\sigma 11 > \sigma 12 > \sigma 13$). The Z-axis directional component force acts as compressive force.

Therefore, in the case having the inside projecting portion 34 and the pair of arc-shape recessed portions 33, the Z-axis directional component forces $\sigma 11$, $\sigma 12$, $\sigma 13$ of compressive stresses act to offset the internal stresses $-\sigma 21$, $-\sigma 22$, $-\sigma 23$ (refer to FIG. 8A) of Z-axis directional tensile stresses in the case having no inside projecting portion 34 and the pair of arc-shape recessed portions 33.

Figure 5B:
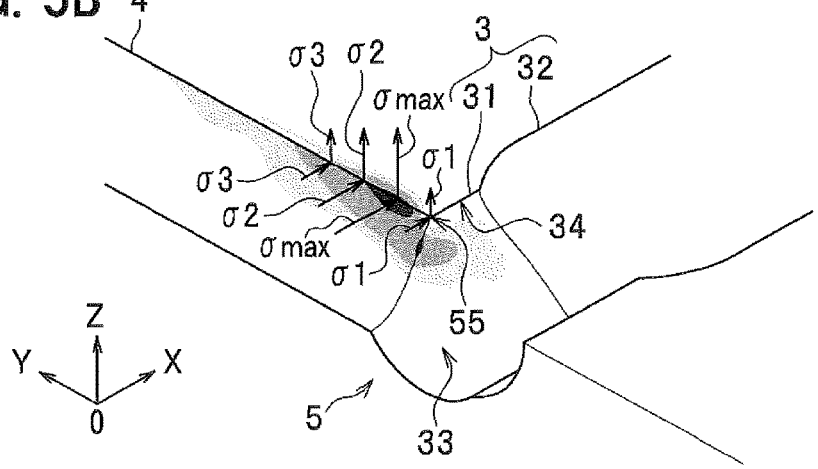
FIG. 5B is an perspective view of the crossing portion viewed by cutting the crossing portion showing a stress distribution of the Z-axis directional stress component in the crossing portion.
Figure 5C:
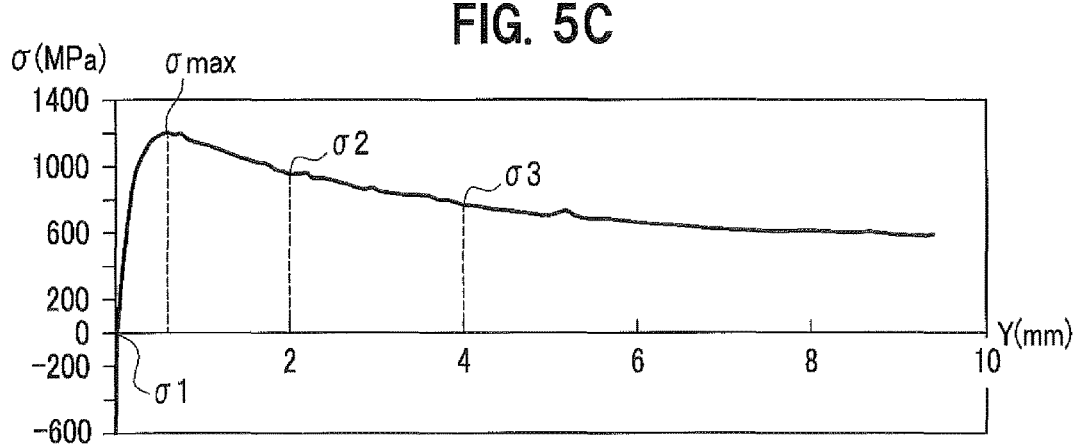
FIG. 5C is a graph showing the stress distribution of the Z-axis directional stress component generated in the crossing portion.

Specifically, as shown in FIGS. 5A, 5B, 5C, in the crossing portion 5, an internal stress $\sigma 1$ ($\sigma 11$-$\sigma 21$) acts at the crossing point 55 (Y=0 mm), an internal stress $\sigma 2$ ($\sigma 12$-$\sigma 22$) acts at a position 2 mm away from the crossing point 55 in the Y-axis direction, and an internal stress $\sigma 3$ ($\sigma 13$-$\sigma 23$) acts at a position 4 mm away from the crossing point 55 in the Y-axis direction. Therefore, the Z-axis directional internal stress $\sigma$ (tensile stress) shows the maximum stress $\sigma$max (refer to FIG. 5C) at a position 0.7 mm away from the crossing point 55 in the Y-axis direction.

Note that, as shown in FIG. 5C, the internal stress $\sigma 1$ is almost 0 MPa, and since the inside projecting portion 34 has the sharp ridge line shape, it is supposed that the fluid pressure in the radial direction is hard to act on the inside projecting portion 34. And the Z-axis directional internal stress $\sigma$ sharply increases from the internal stress $\sigma 1$ to be the maximum stress $\sigma$max. The maximum stress $\sigma$max is about 1200 MPa, and then the Z-axis directional internal stress $\sigma$ gradually decreases from the maximum stress $\sigma$max. The internal stress $\sigma 2$ is about 1000 MPa, and the internal stress $\sigma 3$ is about 850 MPa.

In the following, an operation of the pressing device 8 of the high pressure joint 1 according to the embodiment of the present invention will be explained in detail mainly with reference to FIG. 6.

Figure 6:
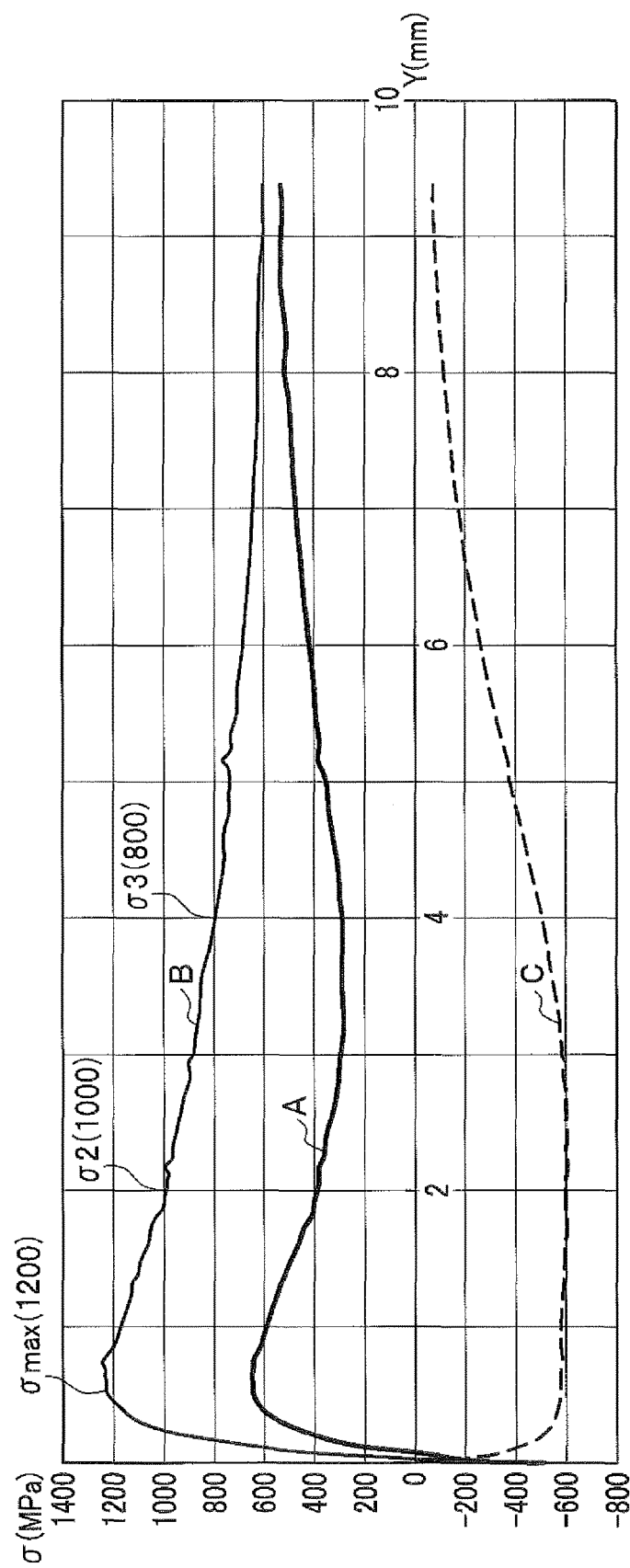
FIG. 6 is a graph showing an effect and operation of a pressing device used in the joint according to the embodiment of the present invention, and the horizontal axis shows a position in the Y-axis direction along a second flow passage and the vertical axis shows the amplitude of the Z-axis directional stress component generated in the peripheral wall of the second flow passage.

FIG. 6 is a graph showing internal stress 6 MPa generated in the neighborhood (Y=0 to 8 mm) of the crossing point 55 of the crossing portion 5. The line A shows an internal stress due to the fluid pressure in the case where the pressing devices 8 give the pressing force in the high pressure joint 1 having the inside projecting portion 34 and the pair of arc-shaped recessed portions 33 according to the embodiment of the present invention. The line B is the same as the line in FIG. 5C, and shows the internal stress due to the fluid pressure in the case having no pressing devices 8. The line C shows an internal stress in the case having no action of the fluid pressure but having the pressing devices 8.

As shown in FIG. 6, the line C shows a state where the pressing devices 8 give the compressive force to the crossing portion 5 and the pressing devices 8 give the compressive stress of about 400 to 600 MPa in the Y range of 0 (crossing point 55) to 5 mm. Thus the tensile stress shown by the line B is offset by the compressive stress shown by the line C to be reduced to the tensile stress shown by the line A. And the pressing devices 8 give the compressive stress of about 400 to 100 MPa in the Y range of 5 to 8 mm.

Thus the stresses σmax (=1200 MPa), σ2 (=1000 MPa), σ3 (=800 MPa) on the line B are reduced to about 600 (=1200−600) MPa, 400 (=1000−600) MPa, 300 (=800−500) MPa on the line A, respectively.

In this way, the pressing devices 8 do not press a position of the axis of the first flow passage 3, but press an area deviated outside (upward in FIG. 4A) the position of the axis of the first flow passage 3, which area includes the crossing points 55 of the crossing portion 5 at which the peripheral wall surface 3a of the first flow passage 3 and the peripheral wall surface 4a of the second flow passage 4 cross with each other on the X-Y plane. The extent of the deviation can be set considering the position of the stress concentration (σmax) and a distance in the Y-axis direction from the position of the stress concentration (σmax).

In this way, in the high pressure joint 1 according to the embodiment of the present invention, the position at which the internal stress has the local maximum value (stress concentration) is moved by the presence of the inside projecting portion 34 and the pair of arc-shaped recessed portions 33 in a direction away from the crossing points 55 along the axis L of the second flow passage 4, that is, toward a position on the presence side of the second flow passage 4. Furthermore, the pressing devices 8, which give the compressive force to the position at which the internal stress has the local maximum value (stress concentration), is provided, so that the pressing devices 8 properly offset the internal stress (tensile stress) due to the fluid pressure to urge to separate the crossing portion 5 in the Z-axis direction and can further improve the durability.

In the above, the embodiment of the present invention has been explained. However, the present invention is not limited to the embodiment, but can be properly modified.

The T-shape high pressure joint 1 has been explained for the embodiment, but the present invention is not limited to it. The present invention may be applied to various shape high pressure joints like an L-shape high pressure joint or a cruciform high pressure joint. That is, the present invention can be applied to a fluid passage having a crossing portion. Furthermore, the crossing angle is not limited to a right angle.

And in the embodiment, the inside projecting portion 34 is formed to be a sharp ridge line, but is not limited to this. One of the pair of arc-shape lines 33a of the pair of arc-shape recessed portions 33 and the other of the pair of arc-shape lines 33a do not cross at a point on the axis L of the second flow passage 4, but may have some distance between two arc-shape lines 33a to form a straight line or a curved line between them in the view along the X-axis direction.

DESCRIPTION OF REFERENCE NUMERALS

1 High pressure joint (fluid passage structure)
2 First casing
3 First flow passage
3a Peripheral wall surface
4 Second flow passage
4a Peripheral wall surface
5 Crossing portion
6 Second casing
8 Pressing device
31 Crossing portion flow passage
32 Connecting flow passage
33 Arc-shape recessed portion
33a Arc-shape line
34 Inside projecting portion
55 Crossing point
L Axis of second flow passage
q1 Internal pressure in first flow passage
q2 Internal pressure in second flow passage

What is claimed is:

1. A fluid passage structure comprising:
a casing having a first flow passage disposed therein, the first flow passage including a flow passage crossing portion;
the casing further having a second flow passage disposed therein, the second flow passage intersecting the flow passage crossing portion of the first flow passage; and
a pressing device configured to apply a pressing force to the casing while holding the casing, the pressing force being applied in a direction orthogonal to an axis of the first flow passage and to an axis of the second flow passage,
wherein the flow passage crossing portion comprises;
a pair of arc-shape recessed portions which are formed to have a pair of arc-shape lines as a part of a cross sectional contour of the flow passage crossing portion in a viewpoint along the axis of the first flow passage, the pair of arc-shaped lines being arranged in line symmetrical positions with respect to the axis of the second flow passage; and
an inside projecting portion which is formed between the pair of arc-shape recessed portions and projects toward an inside of the first flow passage, wherein the pressing device is disposed at a position along the axis of the second flow passage, the position being offset from the axis of the first flow passage, and wherein the pressing device presses an area including crossing points at which a peripheral wall surface of the flow passage crossing portion of the first flow passage and a peripheral wall surface of the second flow passage intersect with each other on a plane including the axis of the first flow passage and the axis of the second flow passage.

2. The fluid passage structure according to claim 1, wherein the inside projecting portion is a ridge line along the axis of the first flow passage.

3. The fluid passage structure according to claim 1, wherein the first flow passage includes a connecting flow passage communicated with the flow passage crossing portion, a diameter of the connecting flow passage is larger than a diameter of the flow passage crossing portion.

4. The fluid passage structure according to claim 2, wherein the first flow passage includes a connecting flow passage communicated with the flow passage crossing portion, a diameter of the connecting flow passage is larger than a diameter of the flow passage crossing portion.

* * * * *